United States Patent
Shi et al.

(10) Patent No.: US 11,558,341 B2
(45) Date of Patent: Jan. 17, 2023

(54) METHOD, DEVICE, AND SYSTEM FOR OBTAINING SRV6 TUNNEL INFORMATION

(71) Applicant: Huawei Technologies Co., Ltd., Shenzhen (CN)

(72) Inventors: Jianjian Shi, Nanjing (CN); Ting Hua, Nanjing (CN); Yongkang Zhang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/216,395

(22) Filed: Mar. 29, 2021

(65) Prior Publication Data

US 2021/0218704 A1  Jul. 15, 2021

Related U.S. Application Data

(63) Continuation of application No. PCT/CN2019/107161, filed on Sep. 23, 2019.

(30) Foreign Application Priority Data

Sep. 29, 2018 (CN) .......................... 201811151917.6

(51) Int. Cl.
*H04L 61/2592* (2022.01)
*H04L 101/65* (2022.01)

(52) U.S. Cl.
CPC ...... *H04L 61/2592* (2013.01); *H04L 2101/65* (2022.05)

(58) Field of Classification Search
CPC .................. H04L 61/6059; H04L 61/2592
(Continued)

(56) References Cited

U.S. PATENT DOCUMENTS 9,191,318 B1 * 11/2015 Van de Velde ....... H04L 61/251
2012/0051231 A1    3/2012 Ou
(Continued)

FOREIGN PATENT DOCUMENTS

| CN | 101945043 A | 1/2011 |
|---|---|---|
| CN | 105024866 A | 11/2015 |

(Continued)

OTHER PUBLICATIONS

Filsfils, c., et al, "Segment Routing Policy for Traffic Engineering," draft-filsfils-spring-segment-routing-policy-04.txt, Dec. 22, 2017, 41 pages.
(Continued)

*Primary Examiner* — Tauqir Hussain
(74) *Attorney, Agent, or Firm* — Conley Rose, P.C.

(57) ABSTRACT

A method for obtaining segment routing over Internet Protocol version 6 data plane (SRv6) tunnel information of Internet Protocol version 6 segment routing, including sending, by a first network device, a request packet to a second network device, where the request packet is used to request to detect reachability of an SRv6 tunnel and obtain SRv6 tunnel information of the second network device, and the second network device is a network device on the SRv6 tunnel, receiving, by the first network device, a response packet from the second network device, where the response packet includes the SRv6 tunnel information of the second network device, and obtaining, by the first network device, the SRv6 tunnel information of the second network device based on the response packet.

20 Claims, 6 Drawing Sheets

(58) Field of Classification Search
USPC .......................................................... 709/220
See application file for complete search history.

(56) References Cited

U.S. PATENT DOCUMENTS

| | | | | |
|---|---|---|---|---|
| 2015/0372913 | A1* | 12/2015 | Van de Velde | H04L 45/04 370/392 |
| 2017/0063783 | A1* | 3/2017 | Yong | H04L 69/22 |
| 2017/0250907 | A1 | 8/2017 | Pignataro et al. | |
| 2018/0026884 | A1 | 1/2018 | Nainar et al. | |
| 2018/0198705 | A1 | 7/2018 | Wang et al. | |
| 2020/0076724 | A1* | 3/2020 | Nainar | H04L 45/50 |
| 2020/0076739 | A1* | 3/2020 | Cox, III | H04L 12/66 |
| 2020/0099610 | A1* | 3/2020 | Heron | H04L 61/256 |
| 2020/0106641 | A1* | 4/2020 | Kommula | H04L 45/306 |
| 2020/0127920 | A1 | 4/2020 | Miao et al. | |
| 2020/0153732 | A1* | 5/2020 | Negi | H04L 61/2592 |
| 2020/0220745 | A1* | 7/2020 | Camarillo Garvia | H04L 45/74 |
| 2020/0225977 | A1* | 7/2020 | Desmouceaux | H04L 45/34 |
| 2020/0244573 | A1* | 7/2020 | Cui | H04W 4/50 |
| 2020/0287826 | A1* | 9/2020 | Wang | H04L 45/66 |
| 2020/0328977 | A1* | 10/2020 | Pfister | H04L 67/5681 |
| 2020/0412846 | A1* | 12/2020 | Filsfils | H04L 67/63 |
| 2021/0135979 | A1* | 5/2021 | Li | H04L 45/04 |

FOREIGN PATENT DOCUMENTS

| | | | | |
|---|---|---|---|---|
| CN | 106330714 | A | 1/2017 | |
| CN | 106487686 | A | 3/2017 | |
| CN | 107248941 | A | 10/2017 | |
| CN | 107968752 | A | 4/2018 | |
| CN | 108023815 | A | 5/2018 | |
| WO | WO-2020072079 | A1 * | 4/2020 | H04L 41/5051 |

OTHER PUBLICATIONS

Ali, Z., et al, "Operations, Administration, and Maintenance (OAM) in Segment Routing Networks with IPv6 Data plane (SRv6)," draft-ali-spring-srv6-oam-01.txt, Jul. 2, 2018, 25 pages.

Ali, Z., "Operations, Administration, and Maintenance (OAM) in Segment Routing Networks with IPv6 Dataplane (SRv6)," draft-ali-6man-srv6-oam-01.txt, Oct. 30, 2017, 15 pages.

Ali, Z., et al, "Bidirectional Forwarding Detection (BFD) for Segment Routing Policies for Traffic Engineering," draft-ali-spring-bfd-sr-policy-00, Mar. 5, 2018, 8 pages.

Ali, Z., "Performance Measurement in Segment Routing Networks," draft-ali-spring-sr-pm-00.txt, Dec. 23, 2017, 12 pages.

Ali, Z., et al, "Traffic Accounting in Segment Routing Networks," draft-ali-spring-sr-traffic-accounting-00.txt, Mar. 5, 2018, 11 pages.

Ali, Z., et al, "Operations, Administration, and Maintenance (OAM) in Segment Routing Networks with IPv6 Data plane (SRv6)," draft-ali-spring-srv6-oam-00.txt, Feb. 26, 2018, 21 pages.

Ali, Z., et al, "Performance Measurement in Segment Routing Networks with IPv6 Data Plane (SRv6)," draft-ali-spring-srv6-pm-02.txt, Feb. 27, 2018, 17 pages.

Bashandy, A., et al, "Topology Independent Fast Reroute using Segment Routing," draft-bashandy-rtgwg-segment-routing-ti-lfa-02, Jan. 19, 2018, 12 pages.

Bashandy, A., et al, "Loop avoidance using Segment Routing," draft-bashandy-rtgwg-segment-routing-uloop-01, Jul. 17, 2017, 7 pages.

Cheng, W., et al, "Path Segment in MPLS Based Sement Routing Network," draft-cheng-spring-mpls-path-segment-01, Mar. 2, 2018, 10 pages.

Chen, R., et al, "Anycast-SID FRR for Segment Routing Network," draft-chen-spring-segemt-routing-anycast-frr-00, Dec. 5, 2017, 5 pages.

Filsfils, C., et al, "Segment Routing Policy for Traffic Engineering," draft-filsfils-spring-segment-routing-policy-05.txt, Feb. 28, 2018, 50 pages.

Filsfils, C., et al, "SRv6 Network Programming," draft-filsfils-spring-srv6-network-programming-04, Mar. 4, 2018, 57 pages.

Filsfils, C., et al, "SRv6 Network Programming," draft-filsfils-spring-srv6-network-programming-05, Jul. 2, 2018, 53 pages.

Fioccola, G., Ed., "Using the IPv6 Flow Label for Performance Measurement with Alternate Marking Method in Segment Routing," draft-fioccola-spring-flow-label-alt-mark-01, Oct. 26, 2017, 8 pages.

Gandhi, R., Ed., et al., "Performance Measurement in Segment Routing Networks with MPLS Data Plane," draft-gandhi-spring-sr-mpls-pm-00.txt, Feb. 14, 2018, 13 pages.

Hegde, S., et al, "Micro-loop avoidance using SPRING," draft-hegde-rtgwg-microloop-avoidance-using-spring-03, Jul. 3, 2017, 21 pages.

Hegde, S., et al, "Node Protection for SR-TE Paths," draft-hegde-spring-node-protection-for-sr-te-paths-02, Oct. 30, 2017, 15 pages.

Hegde, S., "Traffic Accounting for MPLS Segment Routing Paths," draft-hegde-spring-traffic-accounting-for-sr-paths-01, Oct. 30, 2017, 14 pages.

Hu, F., et al, "Segment Routing Transport Profile Use Case," draft-hu-spring-sr-tp-use-case-01.txt, Mar. 4, 2018, 10 pages.

Filsfils, C., Ed. et al, "IPv6 Segment Routing Header (SRH)," draft-ietf-6man-segment-routing-header-14, Jun. 28, 2018, 29 pages.

Matsushima, S., et al, "Segment Routing IPv6 for Mobile User-Plane," draft-ietf-dmm-srv6-mobile-uplane-00, Nov. 30, 2017, 20 pages.

Bryant, S., et al, "RFC6374 Synonymous Flow Labels," draft-ietf-mpls-rfc6374-sfl-00, Jun. 12, 2017, 20 pages.

Kumar, N., Ed. et al, "Label Switched Path (LSP) Ping/Traceroute for Segment Routing IGP Prefix and Adjacency SIDs with MPLS Data-plane," draft-ietf-mpls-spring-lsp-ping-13, Oct. 17, 2017, 23 pages.

Brzozowski, J., et al, "IPv6 SPRING Use Cases," draft-ietf-spring-ipv6-use-cases-12, Dec. 18, 2017, 9 pages.

Cheng, W., et al., "Path Segment in MPLS Based Segment Routing Network," draft-ietf-spring-mpls-path-segment-01, Sep. 16, 2019, 11 pages.

Geib, R., Ed. et al, "A Scalable and Topology-Aware MPLS Dataplane Monitoring System," draft-ietf-spring-oam-usecase-10, Dec. 18, 2017, 19 pages.

Filsfils, C., Ed. et al, "Resiliency use cases in SPRING networks," draft-ietf-spring-resiliency-use-cases-12, Dec. 19, 2017, 11 pages.

Filsfils, C., Ed. et al, "Segment Routing Architecture," draft-ietf-spring-segment-routing-15, Jan. 25, 2018, 31 pages.

Filsfils, C., et al, "Segment Routing Policy Architecture," draft-ietf-spring-segment-routing-policy-01.txt, Jun. 11, 2018, 33 pages.

Kumar, N., et al., "OAM Requirements for Segment Routing Network," draft-ietf-spring-sr-oam-requirement-03, Jan. 2, 2017, 7 pages.

Li, C., et al, "Passive Performance Measurement for SRv6 Network Programming," draft-li-spring-passive-pm-for-srv6-np-00, Mar. 5, 2018, 17 pages.

Litkowski, S., et al, "Implementing non protected paths using SPRING," draft-litkowski-spring-non-protected-paths-02, Aug. 9, 2017, 14 pages.

Mirsky, G., et al, "Bidirectional Forwarding Detection (BFD) in Segment Routing Networks Using MPLS Dataplane," draft-mirsky-spring-bfd-03, Dec. 4, 2017, 10 pages.

Mirsky, G., et al, "Bidirectional Forwarding Detection (BFD) in Segment Routing Networks Using MPLS Dataplane," draft-mirsky-spring-bfd-05, Mar. 1, 2018, 11 pages.

Ali, Z., et al, "Operations, Administration, and Maintenance (OAM) in Segment Routing Networks with IPv6 Dataplane (SRv6)," draft-spring-srv6-oam-00.txt, Dec. 23, 2017, 22 pages.

RFC 792, Postel, J., "Internet Control Message Protocol DARPA Internet Program Protocol Specification," Sep. 1981, 21 pages.

RFC 2151, Kessler, G., et al, "A Primer on Internet and TCP/IP Tools and Utilities," Jun. 1997, 52 pages.

RFC 4379, Kompella, K., et al, "Detecting Multi-Protocol Label Switched (MPLS) Data Plane Failures," Feb. 2006, 50 pages.

RFC 4443, Conta, A., et al., "Internet Control Message Protocol (ICMPv6) for the Internet Protocol Version 6 (IPv6) Specification," Mar. 2006, 24 pages.

(56) References Cited

OTHER PUBLICATIONS

RFC 4884, Bonica, R., et al, "Extended ICMP to Support Multi-Part Messages," Apr. 2007, 19 pages.
RFC 4950, Bonica, R., et al., "ICMP Extensions for Multiprotocol Label Switching," Aug. 2007, 8 pages.
RFC 5837, Atlas, A., Ed. et al, "Extending ICMP for Interface and Next-Hop Identification," Apr. 2010, 18 pages.
RFC 5884, Aggarwal, R., et al, "Bidirectional Forwarding Detection (BFD) for MPLS Label Switched Paths (LSPs)," Jun. 2010, 12 pages.
RFC 6373, Andersson, L., Ed., et al, "MPLS Transport Profile (MPLS-TP) Control Plane Framework," Sep. 2011, 57 pages.
RFC 6374, Frost, D., et al, "Packet Loss and Delay Measurement for MPLS Networks," Sep. 2011, 52 pages.
RFC 7276, Mizrahi, T., et al, "An Overview of Operations, Administration, and Maintenance (OAM) Tools," Jun. 2014, 53 pages.
RFC 7726, Govindan, V., et al, "Clarifying Procedures for Establishing BFD Sessions for MPLS Label Switched Paths (LSPs)," Jan. 2016, 7 pages.
RFC 7881, Pignataro, C., et al., "Seamless Bidirectional Forwarding Detection (S-BFD) for IPv4, IPv6, and MPLS," Jul. 2016, 8 pages.
RFC 7938, Lapukhov, P., et al., "Use of BGP for Routing in Large-Scale Data Centers," Aug. 2016, 35 pages.
RFC 8200, Deering, S., et al, "Internet Protocol, Version 6 (IPv6) Specification," Jul. 2017, 42 pages.
RFC 8287, Kumar, N., Ed. et al, "Label Switched Path (LSP) Ping/Traceroute for Segment Routing (SR) IGP-Prefix and IGP-Adjacency Segment Identifiers (SIDs) with MPLS Data Planes," Dec. 2017, 25 pages.
RFC 8335, Bonica, R., et al., "Probe: A Utility for Probing Interfaces," Feb. 2018, 19 pages.
Shouling, D., et al, "Auto seed selection and discovery algorithm for IPv6 campus network topology," Journal of Xidian University, Issue 02, Apr. 2015, with an English Abstract, 6 pages.
Liu, C.J., et al., "Enhanced IPv6 Ping and TraceRoute," 21st Annual Wireless and Optical Communications Conference(WOCC)—Apr. 19-21, Kaohsiung, Taiwan, 2012, 8 pages.

\* cited by examiner

METHOD, DEVICE, AND SYSTEM FOR OBTAINING SRV6 TUNNEL INFORMATION

CROSS-REFERENCE TO RELATED APPLICATIONS

This application is a continuation of International Patent Application No. PCT/CN2019/107161 filed on Sep. 23, 2019, which claims priority to Chinese Patent Application No. 201811151917.6 filed on Sep. 29, 2018. The disclosures of the aforementioned applications are hereby incorporated by reference in their entireties.

TECHNICAL FIELD

This application relates to the communications field, and in particular, to a method, device, and system for obtaining segment routing over Internet Protocol version 6 data plane (SRv6) tunnel information.

BACKGROUND

Segment routing (SR) is a tunneling technology based on a source routing forwarding mode. A data plane of the SR is implemented by using multi-protocol label switching (MPLS) or an Internet Protocol version 6 (IPv6). IPv6-based SR is referred to as SRv6.

On an Internet Protocol (IP) network, a path discovery function is usually implemented by using an IP traceroute tool. However, IP traceroute does not support obtaining information about an SRv6 tunnel currently.

SUMMARY

A method, a device, and a system for obtaining SRv6 tunnel information provided in embodiments of this application help resolve a problem in other approaches that the SRv6 tunnel information cannot be obtained, and help maintain and manage an SRv6 tunnel.

According to a first aspect, an embodiment of this application provides a method for obtaining SRv6 tunnel information. According to the method, a first network device sends a request packet to a second network device. The request packet is used to request to detect reachability of an SRv6 tunnel and obtain SRv6 tunnel information of the second network device, and the second network device is a network device on the SRv6 tunnel. The first network device receives a response packet from the second network device. The response packet includes the SRv6 tunnel information of the second network device. The first network device obtains the SRv6 tunnel information of the second network device based on the response packet.

The request packet that detects the reachability of the SRv6 tunnel (or path) is extended to enable an SRv6 tunnel detection tool traceroute to obtain the SRv6 tunnel information. This helps maintain and manage the SRv6 tunnel.

In a possible design, before that a first network device sends a request packet to a second network device, the method further includes the first network device obtains a keyword from a command line configured by a user, and generates the request packet based on the keyword, where the keyword indicates to obtain SRv6 tunnel information of a network device on the SRv6 tunnel, or the first network device receives a message sent by a control management device, and generates the request packet based on the message, where the message indicates to obtain the SRv6 tunnel information of the network device on the SRv6 tunnel.

A configuration parameter sent by the control management device is configured or received by the command line. This helps flexibly obtain the SRv6 tunnel information on demand.

In a possible design, the request packet is a User Datagram Protocol (UDP) packet. The UDP packet includes a first field. The first field indicates to obtain the SRv6 tunnel information of the network device on the SRv6 tunnel.

The first field is extended in the UDP packet to indicate to obtain the SRv6 tunnel information of the network device on the SRv6 tunnel. This provides a simple and convenient method with good extendability, and helps implement a solution in a simple and convenient manner with good backward compatibility.

In a possible design, the SRv6 tunnel information of the network device on the SRv6 tunnel includes at least one of the following information active segment identifier (SID) information of the network device on the SRv6 tunnel, SR policy information that is of the network device on the SRv6 tunnel and that is associated with a binding SID (BSID), and service chain information of the network device on the SRv6 tunnel.

Further classification of the SRv6 tunnel information helps flexibly manage the SRv6 tunnel information based on a user requirement. This avoids problems such as failure to quickly locate required information, high transmission bandwidth usage, and large storage space usage that are caused by excessive SRv6 information.

In a possible design, the UDP packet further includes a second field, and the second field indicates to obtain at least one of the following information the active SID information of the network device on the SRv6 tunnel, the SR policy information that is of the network device on the SRv6 tunnel and that is associated with the BSID, and the service chain information of the network device on the SRv6 tunnel.

The second field is extended in the UDP packet to indicate to obtain several pieces of classification information in the SRv6 tunnel information. This provides a simple and convenient method with good extendability, and helps accurately obtain a type of information in the SRv6 tunnel information required by the user.

In a possible design, the UDP packet further includes at least one of the following fields an optional field, a length field, and a reserved field. The optional field is used to carry a parameter in the information that the second field indicates to obtain. The length field is used to indicate a length of the optional field. The reserved field is used to define a new function in the future.

The optional field, the length field, and the reserved field are extended in the UDP packet to provide a simple and convenient method with good extendability. This helps obtain a parameter (sub-information) in a piece of classification information in the SRv6 tunnel information, and further improves a fine granularity of the obtained SRv6 tunnel information.

In a possible design, the response packet is an internet control message protocol (ICMP) packet, and the ICMP packet carries the SRv6 tunnel information of the second network device.

The ICMP packet is extended to carry the SRv6 tunnel information of the second network device. This provides a simple and convenient method, and helps implement a solution in a simple and convenient manner.

In a possible design, the SRv6 tunnel information of the second network device includes at least one of the following information active SID information of the second network device, SR policy information that is of the second network device and that is associated with a BSID, and service chain information of the second network device.

Further classification of the SRv6 tunnel information helps flexibly manage the SRv6 tunnel information based on a user requirement. This avoids problems such as failure to quickly locate required information, high transmission bandwidth usage, and large storage space usage that are caused by excessive SRv6 information.

In a possible design, the ICMP packet includes an ICMP extension object field. The ICMP extension object field includes a length field, a classification number (Class-Num) field, a classification type (C-Type) field, and an object payload field. The length field is used to indicate a length of the ICMP extension object field. A value of the Class-Num field indicates that the object payload field carries the SRv6 tunnel information of the network device on the SRv6 tunnel. A value of the C-Type field indicates that the object payload field carries the active SID information of the network device on the SRv6 tunnel, the SR policy information that is of the network device on the SRv6 tunnel and that is associated with the BSID, or the service chain information of the network device on the SRv6 tunnel. A value of the object payload field is at least one of the active SID information of the second network device, the SR policy information that is of the second network device and that is associated with the BSID, and the service chain information of the second network device.

A value of the extension object field in the ICMP packet is extended to support carrying SRv6 tunnel information of classification granularities. This provides a simple and convenient method for implementing a solution in a simple and convenient manner. SRv6 tunnel information that is of granularities and that is required by the user is flexibly carried on demand.

According to a second aspect, an embodiment of this application provides a method for sending SRv6 tunnel information. According to the method, a second network device receives a request packet from a first network device. The request packet is used to request to detect reachability of an SRv6 tunnel and obtain SRv6 tunnel information of the second network device, and the second network device is a network device on the SRv6 tunnel. The second network device obtains the SRv6 tunnel information of the second network device based on the request packet. The second network device sends the response packet to the first network device. The response packet includes the SRv6 tunnel information of the second network device.

The request packet that detects the reachability of the SRv6 tunnel is extended to enable a traceroute to obtain the SRv6 tunnel information. This helps maintain and manage the SRv6 tunnel.

In a possible design, the request packet is a UDP packet. The UDP packet includes a first field. The first field indicates to obtain the SRv6 tunnel information of the network device on the SRv6 tunnel.

The first field is extended in the UDP packet to indicate to obtain the SRv6 tunnel information of the network device on the SRv6 tunnel. This provides a simple and convenient method with good extendability, and helps implement the solution in a simple and convenient manner with good backwards compatibility.

In a possible design, the SRv6 tunnel information of the network device on the SRv6 tunnel includes at least one of the following information active SID information of the network device on the SRv6 tunnel, SR policy information that is of the network device on the SRv6 tunnel and that is associated with a BSID, and service chain information of the network device on the SRv6 tunnel.

Further classification of the SRv6 tunnel information helps flexibly manage the SRv6 tunnel information based on a user requirement. This avoids problems such as failure to quickly locate required information, high transmission bandwidth usage, and large storage space usage that are caused by excessive SRv6 information.

In a possible design, the UDP packet further includes a second field, and the second field indicates to obtain at least one of the following information the active SID information of the network device on the SRv6 tunnel, the SR policy information that is of the network device on the SRv6 tunnel and that is associated with the BSID, and the service chain information of the network device on the SRv6 tunnel.

The second field is extended in the UDP packet to indicate to obtain several pieces of classification information in the SRv6 tunnel information. This provides a simple and convenient method with good extendability, and helps accurately obtain a type of information in the SRv6 tunnel information required by a user.

In a possible design, the UDP packet further includes at least one of the following fields an optional field, a length field, and a reserved field. The optional field is used to carry a parameter in the information that the second field indicates to obtain. The length field is used to indicate a length of the optional field. The reserved field is used to define a new function in the future.

The optional field, the length field, and the reserved field are extended in the UDP packet to provide a simple and convenient method with good extendability. This helps obtain a parameter (sub-information) in a piece of classification information in the SRv6 tunnel information, and further improves a fine granularity of the obtained SRv6 tunnel.

In a possible design, that the second network device obtains the SRv6 tunnel information of the second network device based on the request packet includes the following. When the first field indicates to obtain the SRv6 tunnel information of the network device on the SRv6 tunnel, and the second field indicates to obtain the active SID information of the network device on the SRv6 tunnel, the second network device obtains active SID information of the second network device. When the first field indicates to obtain the SRv6 tunnel information of the network device on the SRv6 tunnel, and the second field indicates to obtain the SR policy information that is of the network device on the SRv6 tunnel and that is associated with the BSID, the second network device obtains SR policy information that is of the second network device and that is associated with a BSID. When the first field indicates to obtain the SRv6 tunnel information of the network device on the SRv6 tunnel, and the second field indicates to obtain the active SID information of the network device on the SRv6 tunnel and the SR policy information that is of the network device on the SRv6 tunnel and that is associated with the BSID, the second network device obtains the active SID information of the second network device and the SR policy information that is of the second network device and that is associated with the BSID. When the first field indicates to obtain the SRv6 tunnel information of the network device on the SRv6 tunnel, and the second field indicates to obtain the service chain information of the network device on the SRv6 tunnel, the second network device obtains service chain information of the second network device. When the first field indicates to obtain the SRv6 tunnel information of the network device on the SRv6 tunnel, and the second field indicates to obtain the service chain information of the network device on the SRv6 tunnel and the active SID information of the network device on the SRv6 tunnel, the second network device obtains the service chain information of the network device on the SRv6 tunnel and the active SID information of the network device on the SRv6 tunnel. When the first field indicates to obtain the SRv6 tunnel information of the network device on the SRv6 tunnel, and the second field indicates to obtain the service chain information of the network device on the SRv6 tunnel and the SR policy information that is of the network device on the SRv6 tunnel and that is associated with the BSID, the second network device obtains the service chain information of the network device on the SRv6 tunnel and the SR policy information that is of the network device on the SRv6 tunnel and that is associated with the BSID. When the first field indicates to obtain the SRv6 tunnel information of the network device on the SRv6 tunnel, and the second field indicates to obtain the service chain information of the network device on the SRv6 tunnel, the active SID information of the network device on the SRv6 tunnel, and the SR policy information that is of the network device on the SRv6 tunnel and that is associated with the BSID, the second network device obtains the service chain information of the network device on the SRv6 tunnel, the active SID information of the network device on the SRv6 tunnel, and the SR policy information that is of the network device on the SRv6 tunnel and that is associated with the BSID.

Based on a requirement indicated by the first field and a requirement indicated by the second field, the second network device obtains the related SRv6 tunnel information of the second network device on demand. This helps accurate and quick obtaining of information, and improves efficiency and flexibility of the obtaining of the information.

In a possible design, the response packet is an ICMP packet, and the ICMP packet carries the SRv6 tunnel information of the second network device.

The ICMP packet is extended to carry the SRv6 tunnel information of the second network device. This provides a simple and convenient method, and helps implement a solution in a simple and convenient manner.

In a possible design, the SRv6 tunnel information of the second network device includes at least one of the following information the active SID information of the second network device, the SR policy information that is of the second network device and that is associated with the BSID, and the service chain information of the second network device.

Further classification of the SRv6 tunnel information helps flexibly manage the SRv6 tunnel information based on a user requirement. This avoids problems such as failure to quickly locate required information, high transmission bandwidth usage, and large storage space usage that are caused by excessive SRv6 information.

In a possible design, the ICMP packet includes an ICMP extension object field. The ICMP extension object field includes a length field, a Class-Num field, a C-Type field, and an object payload field. The length field is used to indicate a length of the ICMP extension object field. A value of the Class-Num field indicates that the object payload field carries the SRv6 tunnel information of the network device on the SRv6 tunnel. A value of the C-Type field indicates that the object payload field carries the active SID information of the network device on the SRv6 tunnel, the SR policy information that is of the network device on the SRv6 tunnel and that is associated with the BSID, or the service chain information of the network device on the SRv6 tunnel. A value of the object payload field is at least one of the active SID information of the second network device, the SR policy information that is of the second network device and that is associated with the BSID, and the service chain information of the second network device.

A value of the extension object field in the ICMP packet is extended to support carrying SRv6 tunnel information of classification granularities. This provides a simple and convenient method for implementing a solution in a simple and convenient manner. SRv6 tunnel information that is of granularities and that is required by the user is flexibly carried on demand.

According to a third aspect, an embodiment of this application provides a first network device. The first network device includes a memory and a processor connected to the memory. The processor is configured to execute a computer-readable instruction in the memory, to perform the method in any one of the first aspect or the possible implementations of the first aspect.

According to a fourth aspect, the present disclosure provides a computer-readable medium, including an instruction. When the instruction is run on a computer, the computer is enabled to perform the method in any one of the first aspect or the possible implementations of the first aspect.

According to a fifth aspect, an embodiment of this application provides a second network device. The second network device includes a memory and a processor connected to the memory. The processor is configured to execute a computer-readable instruction in the memory, to perform the method in any one of the second aspect or the possible implementations of the second aspect.

According to a sixth aspect, the present disclosure provides a computer-readable medium, including an instruction. When the instruction is run on a computer, the computer is enabled to perform the method in any one of the second aspect or the possible implementations of the second aspect.

According to a seventh aspect, the present disclosure provides a system. The system includes the first network device according to the third aspect or the fourth aspect and the second network device according to the fifth aspect or the sixth aspect.

BRIEF DESCRIPTION OF DRAWINGS

To describe the technical solutions in the embodiments of this application or in other approaches more clearly, the following briefly introduces the accompanying drawings for describing the embodiments or other approaches. Apparently, the accompanying drawings in the following description show certain embodiments recorded in this application, and a person of ordinary skill in the art may still derive other drawings from these accompanying drawings.

DESCRIPTION OF EMBODIMENTS

Figure 1A:
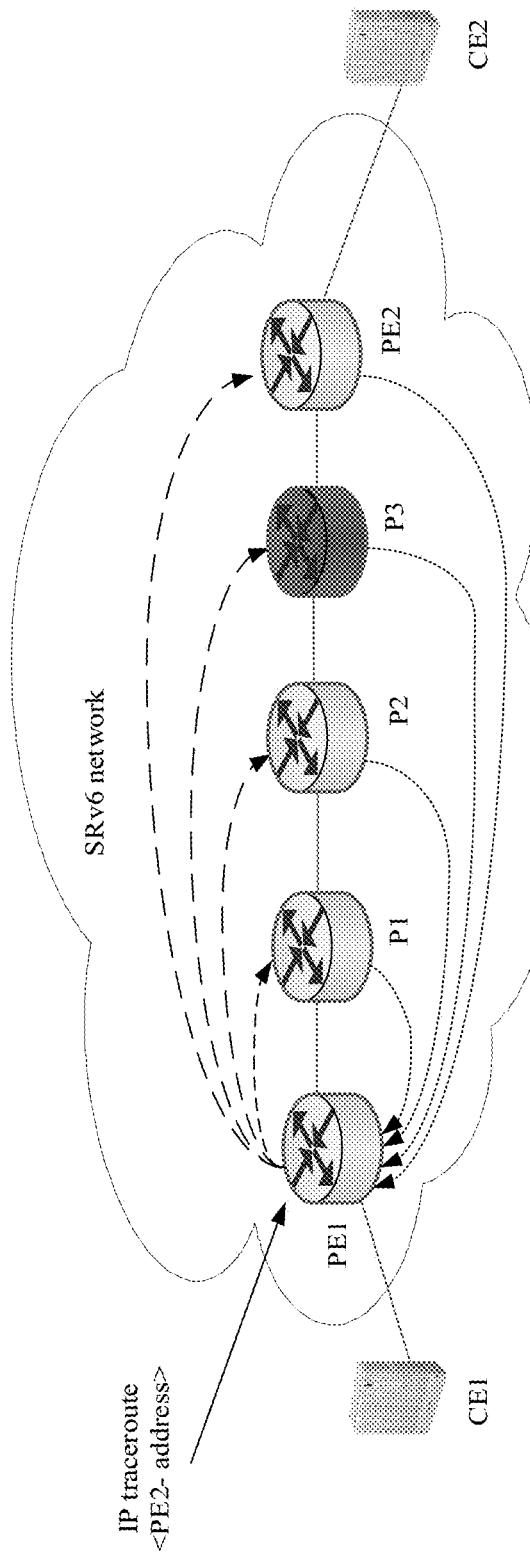
FIG. 1A is a schematic diagram of a network application scenario according to an embodiment of this application.

The technical solutions according to embodiments of the present disclosure are clearly described in the following with reference to the accompanying drawings. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

The network architecture and the service scenario described in the embodiments of the present disclosure are intended to describe the technical solutions in the embodiments of the present disclosure more clearly, and do not constitute a limitation on the technical solutions provided in the embodiments of the present disclosure. A person of ordinary skill in the art may know that, with evolution of the network architecture and emergence of new service scenarios, the technical solutions provided in the embodiments of the present disclosure are also applicable to similar technical problems.

The present disclosure is applied to an SRv6 network. Therefore, concepts related to SRv6 are first briefly described below.

A basic design idea of SR (including a data plane that is based on two manners MPLS or IPv6) is that a per-flow status (that is, an SR policy) needs to be maintained only on an ingress node of a service flow path (namely, an SR tunnel), and does not need to be maintained on a transit node and an egress node. SRv6 is implemented through defining of a new IPv6 routing header (referred to as an SR header (SRH)). The SRH is an IPv6 routing header whose routing type is 4 (Routing Type=4). A SID list carried in the SRH is used to specify a forwarding path of an IPv6 packet. Specifically, the SRH includes a next header field, a segment left field, and a segment list (Segment List[n]) field. The next header indicates a protocol header carried after the SRH header. The segment list carries IP addresses of specified nodes (excluding a source node) that the forwarding path needs to pass through. The IP addresses are expressed in a form of an array. A subscript of the array ranges from 0 to n, and n is a positive integer. n+1 represents a quantity of specified nodes that the forwarding path needs to pass through except the ingress node. The segment left field indicates the subscript of the array. It should be noted that, in this application, the SID list is the same as the segment list. For details of the SRH, please refer to a draft released by the internet engineering task force (IETF) draft-ietf-6man-segment-routing-header. Contents of this document and parts related to this aspect seem to be copied as a whole, and are incorporated into this application by reference (incorporated by reference). For a description of a contradiction or conflict that the document has with this application, a description of this application shall prevail. For brevity, details are not described.

The SRH uses a loose source routing mode. To be specific, each hop on the forwarding path is not required to support and parse the SRH, and the SID list in the SRH is not required to include each hop on the path. An SRv6 tunnel packet may not include the SRH.

An SRv6 tunnel can be established in a distributed or centralized manner. For example, a SID is released through an interior gateway protocol (IGP) and a border gateway protocol (BGP) in the distributed manner. A controller collects the SID and computes a path through software-defined networking (SDN) in the centralized manner.

On the ingress node, a SID list of the SRv6 tunnel may be specified in two manners an explicit candidate path and a dynamic candidate path. For details, refer to a document released by the IETF draft-ietf-spring-segment-routing-policy. Contents of this document and parts related to this aspect seem to be copied as a whole, and are incorporated into this application by reference (incorporated by reference). For a description of a contradiction or conflict that the document has with this application, a description of this application shall prevail. For brevity, details are not described.

To hide topology details of some networks and avoid a problem that a maximum SID depth (MSD) of a hardware chip is insufficient, a BSID may be used to steer traffic to the SR policy.

In comparison with SR MPLS, in addition to universal characteristics of the SR, the SRv6 supports network programming, which makes the SRv6 highly extendable. The SRv6 may be applicable to various application scenarios, for example, implementations of functions such as BGP/SR layer 3 virtual private network (L3VPN), Ethernet virtual private network (EVPN) layer 2 virtual private network (L2VPN)/L3VPN and service function chain (SFC). Conceptually, the SID is an instruction with a topology or service semantics. The network programming is to effectively combine SIDs based on a service requirement to form the SID list (representing a forwarding path of the SRv6 tunnel). For details of the SRv6 network programming, refer to a document released by the IETF draft-filsfils-spring-srv6-network-programming. Contents of this document and parts related to this aspect seem to be copied as a whole, and are incorporated into this application by reference (incorporated by reference). For a description of a contradiction or conflict that the document has with this application, a description of this application shall prevail. In this specification, for brevity, details are not described herein.

For the SRv6, the SID is a 16-bytes IPv6 address. The SID includes three parts a locator, a function, and an argument. The argument is optional. The locator is usually used for addressing (related to routing). The function indicates a function (for example, a topology or a service) related to the SID, and the argument indicates a parameter for performing an operation related to the function.

On the forwarding path of the SRv6 tunnel, nodes may be classified into the following types (namely, device roles).

A non-SRv6 node. It is a node that does not support or on which the SRv6 is not enabled. This type of node performs only native IPv6 forwarding processing.

A transit node. It is a node on which an SRv6 function is enabled. However, an active SID of an SRv6 packet is not installed in a my local SID table.

A BSID node. It is a node on which the SRv6 function and a BSID mechanism are enabled. This node uses the BSID mechanism to steer the traffic to a new SR policy. For details about the BSID mechanism, refer to the document released by the IETF draft-ietf-spring-segment-routing-policy. Contents of this document and parts related to this aspect seem to be copied as a whole, and are incorporated into this application by reference (incorporated by reference). For a description of a contradiction or a conflict that the document has with this application, a description of this application shall prevail. For brevity, details are not described.

An endpoint node. It is a node on which the SRv6 function is enabled and the active SID of the SRv6 packet has been installed in the my local SID table.

To implement the SRv6 network programming, the my local SID table is required. The table maintains all local SIDs (SIDs allocated and parsed by the endpoint node) of the endpoint node.

When receiving the IPv6 packet, the transit node or the endpoint node first uses the active SID (that is, an outer IPv6 destination address (DA) in the IPv6 packet) to query the my local SID table. If there is a matching entry, a function associated with a local SID is executed.

Figure 1B:
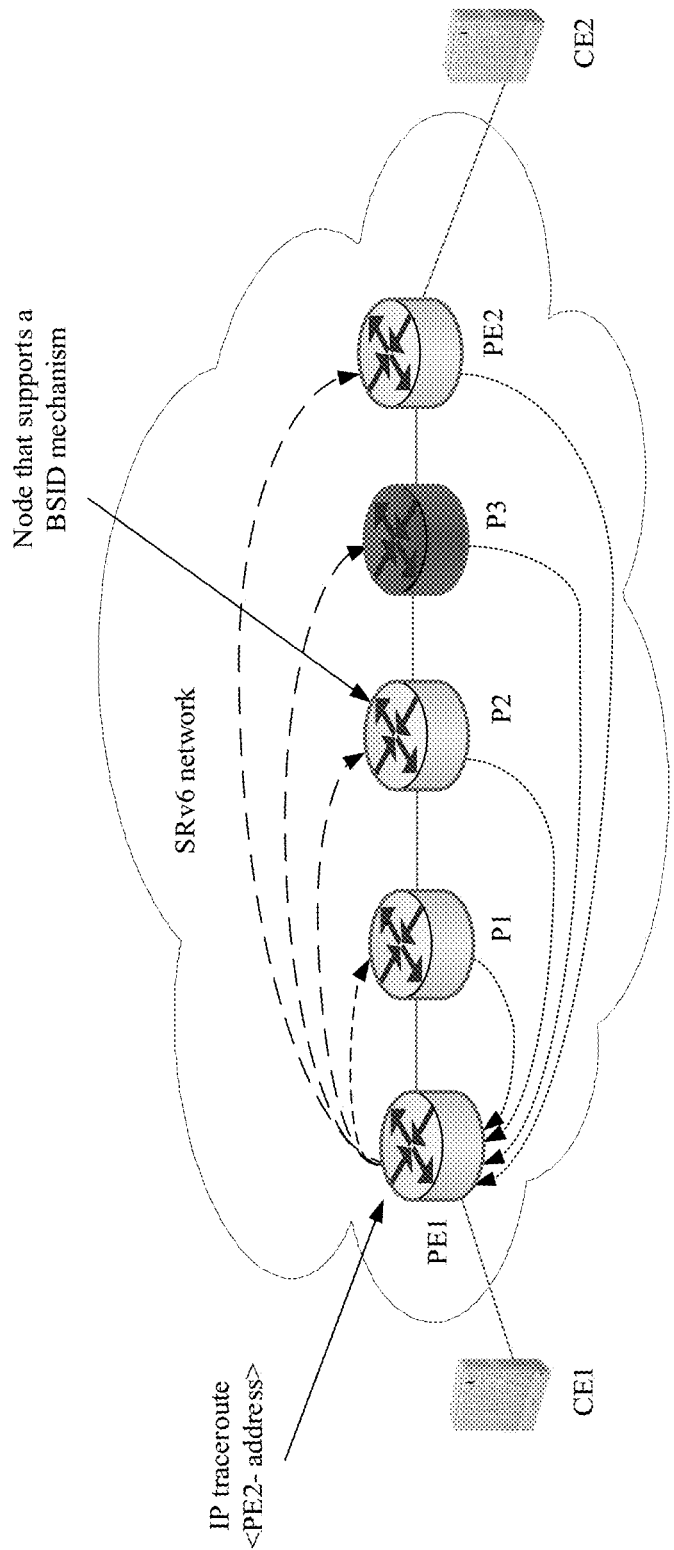
FIG. 1B is a schematic diagram of another network application scenario according to an embodiment of this application.

After the concepts related to the SRv6 are briefly introduced, the following describes two SRv6 network scenarios in FIG. 1A and FIG. 1B with examples.

The SRv6 network usually includes a plurality of network devices that support an SRv6 technology. The network device may be a device such as a router or a switch. The router and the switch may be physical devices, or may be virtual devices (for example, a virtual server, a virtual router, and a virtual switch) implemented based on a virtualization technology. The network device may also be referred to as, for example, a customer edge (CE) device, a provider edge (PE) device, or a provider (P) device, based on a deployment location, a function, a feature, or the like in a specific network. The CE device, the PE device, and the P device are respectively referred to as CE, PE, and P in the following.

FIG. 1A is a schematic diagram of an SRv6 network that does not support a BSID. The schematic diagram of the network includes CE1, PE1, P1, P2, P3, PE2, and CE2. An SRv6 tunnel, for example, an SRv6 best effort (BE) tunnel or an SRv6 traffic engineering (TE) tunnel, is established between PE1 and PE2. PE1 is an ingress node of the SRv6 tunnel, PE2 is an egress node of the SRv6 tunnel, and P1, P2, and P3 are transit nodes of the SRv6 tunnel. PE1, PE2, P1, and P2 support and enable an SRv6 function, and are the endpoint nodes. P3 does not support or enable the SRv6 function, and is the non-SRv6 node or the transit node. SRv6 node SIDs have been configured on P1, P2, and PE2, installed in my local SID tables of P1, P2, and PE2, and released to PE1. For example, the SRv6 node SIDs are released by an IGP, a BGP, or an SDN controller.

In the network shown in FIG. 1A, for example, an operation of detecting reachability of the SRv6 tunnel is initiated on PE1. PE1 separately sends an IP traceroute detection packet (for example, a UDP detection packet) to P1, P2, P3, and PE2 to detect reachability from PE1 to PE2. On PE1, these UDP detection packets are steered to an SR policy 1 through matching of an forwarding information base (FIB) table. In FIG. 1A, the SR policy 1 indicates a SID list of a forwarding path from PE1 to PE2 (that is, a forwarding SID list of the entire SRv6 tunnel). These UDP detection packets are directly transmitted to PE2 along the SRv6 tunnel according to the SR policy 1.

FIG. 1B is a schematic diagram of an SRv6 network that supports a BSID mechanism. A networking structure in FIG. 1B is similar to that in FIG. 1A. A difference is that the BSID technology (or mechanism) is further supported in the networking structure in FIG. 1B. For example, P2 further supports the BSID mechanism, and is a BSID node.

In the network shown in FIG. 1B, for example, an operation of detecting reachability of the SRv6 tunnel is initiated on PE1. PE1 separately sends an IP traceroute detection packet (for example, a UDP detection packet) to P1, P2, P3, and PE2 to detect reachability from PE1 to PE2. On PE1, these UDP detection packets are steered to an SR policy 1 through matching of a FIB table. In FIG. 1B, the SR policy 1 indicates a SID list of a forwarding path from PE1 to P2 (that is, a forwarding SID list that is in the SRv6 tunnel and that is from PE1 to P2). These UDP detection packets are transmitted to P2 (P2 supports the BSID mechanism) along the SRv6 tunnel according to the SR policy 1. On P2, the BSID mechanism is used to steer these UDP detection packets to an SR policy 2. The SR policy 2 indicates a SID list of a forwarding path from P2 to PE2 (that is, a forwarding SID list that is in the SRv6 tunnel and that is from P2 to PE2). These UDP detection packets are transmitted to PE2 along the SRv6 tunnel according to the SR policy 2.

In the embodiments of the present disclosure, the IP traceroute detection packet is extended to provide a method for obtaining SRv6 tunnel information, to resolve a problem in other approaches that the SRv6 tunnel information cannot be obtained.

Figure 2:
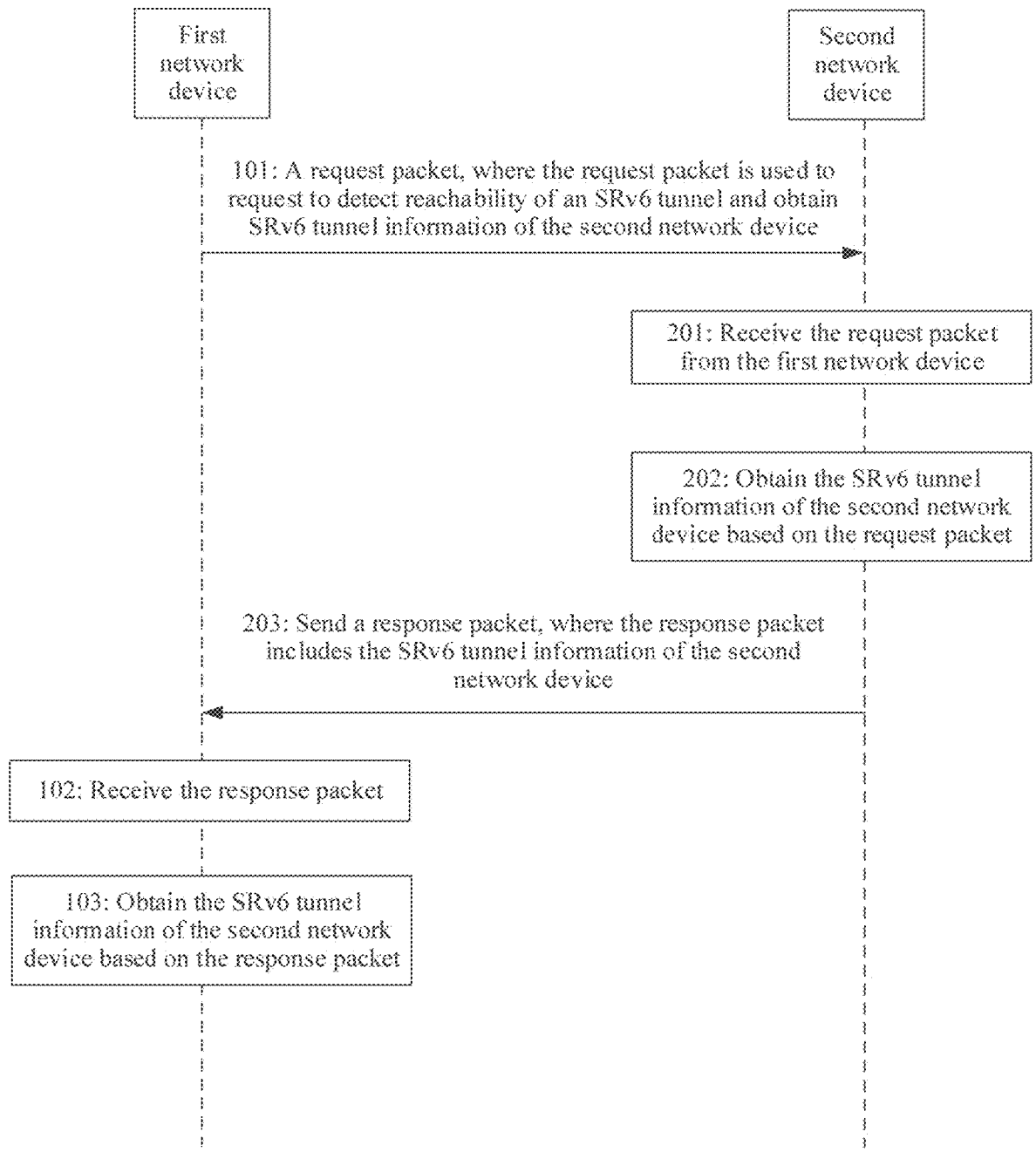
FIG. 2 is a flowchart of a method for obtaining SRv6 tunnel information according to an embodiment of this application.

FIG. 2 is a schematic flowchart of a method for obtaining SRv6 tunnel information according to an embodiment of the present disclosure. The method includes the following contents.

101. A first network device sends a request packet to a second network device, where the request packet is used to request to detect reachability of an SRv6 tunnel and obtain SRv6 tunnel information of the second network device, and the second network device is a network device on the SRv6 tunnel.

The request packet is, for example, an extended IP traceroute packet. The extended IP traceroute packet may be implemented through extension of two types of packets a UDP packet and an ICMP packet (for example, a Ping request). A destination port number of the UDP packet (also referred to as a UDP detection packet) uses an unused UDP port number (for example, a default value is 33434) of a detected target node. An extended UDP packet is described in detail in the following.

It should be noted that a traceroute is one of common tools for managing an IP network, and is configured to implement a path discovery function, for example, displaying a path and measuring a delay of a data packet forwarded through a network node (for example, a router or a switch) on an IP network. The traceroute may be applied to different program operating systems such as a modern UNIX system. For example, in a LINUX system, the traceroute is referred to as a tracepath. In a WINDOWS system, the traceroute is referred to as a tracert. In an IPv6 protocol, the traceroute may be referred to as a traceroute6 or a tracert6. For different application systems, names of corresponding traceroutes are different. This is not limited in this embodiment of this application.

The SRv6 tunnel information may be a whole set of unclassified information, or may be further classified into a set of several types of information. For example, the SRv6 tunnel information is further classified into several types of information, including active SID information, SR policy information associated with a BSID, service chain information, and the like. The active SID information indicates information related to an active SID, including a device role, a SID value, a SID type (for example, a Node SID, an adjacency SID, a BSID, and the like), a SID function (for example, End, End.X, and the like), and the like. The SR policy information associated with the BSID indicates information related to an SR policy associated with the BSID, including an active candidate path, and the like. The service chain information indicates information related to a service chain, including a service chain identifier, a service chain path, and the like. For details about an information model of the SR policy, refer to a document released by the IETF draft-ietf-spring-segment-routing-policy. Contents of this document and parts related to this aspect seem to be copied as a whole, and are incorporated into this application by reference (incorporated by reference). For a description of a contradiction or conflict that the document has with this application, a description of this application shall prevail. For brevity, details are not described.

Further classification of the SRv6 tunnel information helps flexibly manage the SRv6 tunnel information based on a user requirement. This avoids problems such as failure to quickly locate required information, high transmission bandwidth usage, and large storage space usage that are caused by excessive SRv6 information.

In a specific implementation, before that a first network device sends a request packet to a second network device, the first network device obtains a keyword from a command line configured by a user, and generates the request packet based on the keyword. The keyword indicates to obtain SRv6 tunnel information of a network device on the SRv6 tunnel.

For example, the command line is:

tracert destination-ip-address -srv6.

-srv6 is a newly added optional parameter (namely, the keyword), and is used to indicate to obtain the SRv6 tunnel information. destination-ip-address is used to indicate an IP address of the detected target node.

Further, when the SRv6 tunnel information is classified into several types (for example, information types such as the active SID information, the SR policy information associated with the BSID, and the service chain information), the newly added keyword in the command line may further include a subkeyword indicating the information type, for example:

tracert destination-ip-address -srv6{active-sid|bsid|s-chain . . . |}.

A subkeyword active-sid indicates the active SID information. A subkeyword bsid indicates the SR policy information associated with the BSID. A subkeyword s-chain indicates the service chain information.

In another specific implementation, before that a first network device sends a request packet to a second network device, the first network device receives a message sent by a control management device, and generates the request packet based on the message. The message indicates to obtain the SRv6 tunnel information of the network device on the SRv6 tunnel.

The message may be sent through a management channel, or may be sent over a control channel protocol. Currently, a commonly used management channel protocol may be a simple network management protocol (SNMP), a network configuration protocol (NETCONF), or the like. Currently, a commonly used control channel protocol may be an OpenFlow protocol, a path computation element communication protocol (PCEP), a BGP, an interface to the routing system (I2RS) protocol, or the like.

A configuration parameter sent by the control management device is configured or received by the command line. This may flexibly specify a to-be-detected server in an anycast server cluster on demand.

In still another specific implementation, the request packet is a UDP packet. The UDP packet includes a first field, and the first field indicates to obtain the SRv6 tunnel information of the network device on the SRv6 tunnel. The SRv6 tunnel information of the network device on the SRv6 tunnel includes at least one of the following information active SID information of the network device on the SRv6 tunnel, SR policy information that is of the network device on the SRv6 tunnel and that is associated with a BSID, and service chain information of the network device on the SRv6 tunnel.

The first field is extended in the UDP packet to indicate to obtain the SRv6 tunnel information of the network device on the SRv6 tunnel. This provides a simple and convenient method with good extendability, and helps implement a solution in a simple and convenient manner with good backward compatibility.

The UDP packet further includes a second field, and the second field indicates to obtain at least one of the following information:

the active SID information of the network device on the SRv6 tunnel, the SR policy information that is of the network device on the SRv6 tunnel and that is associated with the BSID, and the service chain information of the network device on the SRv6 tunnel.

To be specific, a case that may be indicated by the second field includes:

(1) obtaining the active SID information of the network device on the SRv6 tunnel, (2) obtaining the SR policy information that is of the network device on the SRv6 tunnel and that is associated with the BSID, (3) obtaining the active SID information of the network device on the SRv6 tunnel and the SR policy information that is of the network device on the SRv6 tunnel and that is associated with the BSID, (4) obtaining the service chain information of the network device on the SRv6 tunnel, (5) obtaining the service chain information of the network device on the SRv6 tunnel and the active SID information of the network device on the SRv6 tunnel, (6) obtaining the service chain information of the network device on the SRv6 tunnel and the SR policy information that is of the network device on the SRv6 tunnel and that is associated with the BSID, and (7) obtaining the service chain information of the network device on the SRv6 tunnel, the active SID information of the network device on the SRv6 tunnel, and the SR policy information that is of the network device on the SRv6 tunnel and that is associated with the BSID.

The second field is extended in the UDP packet to indicate to obtain several pieces of classification information in the SRv6 tunnel information. This provides a simple and convenient method with good extendability, and helps accurately obtain a type of information in the SRv6 tunnel information required by the user.

The UDP packet further includes at least one of the following fields:

an optional field, used to carry a parameter (information) in the information that the second field indicates to obtain, a length field, used to indicate a length of the optional field, and a reserved field, used to define a new function in the future.

The optional field, the length field, and the reserved field are extended in the UDP packet to provide a simple and convenient method with good extendability. This helps obtain a parameter (sub-information) in a piece of classification information in the SRv6 tunnel information, and further improves a fine granularity of the obtained SRv6 tunnel.

Figure 3A:
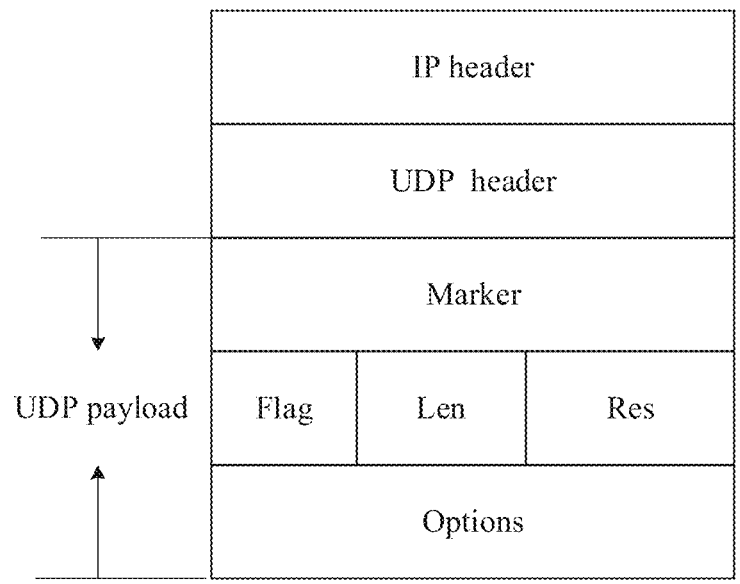
FIG. 3A is a schematic diagram of a field format of a UDP packet according to an embodiment of this application.

A field format of the UDP packet is shown in FIG. 3A. The UDP packet is encapsulated in an IP packet, and the IP packet may be an IP version 4 (IPv4) packet or an IPv6 packet. A marker field, that is, the first field described above, is extended in a payload of the UDP packet. The marker field indicates a type of information that needs to be obtained. For example, a hexadecimal value 0x00 indicates the SRv6 tunnel information, and 0x01 indicates another type of information to be obtained in the future. Therefore, the marker field is also used to implement backward compatibility, and a length of the marker field is, for example, 8 bytes. When the UDP detection packet is generated, if the marker field is set to 0x00, a detection initiation node PE1 expects to obtain the SRv6 tunnel information. The SRv6 tunnel information includes the active SID information, the SR policy information associated with the BSID, the service chain information, and the like.

Further, a flag field, that is, the second field described above, may be extended in the payload of the UDP packet. The flag field indicates to obtain several pieces of specific information in information indicated by the marker field. For example, a value of the flag field indicates the following cases, when the value of the flag field is a hexadecimal value 0x01, it indicates that the active SID information needs to be obtained, when the value of the flag field is a hexadecimal value 0x10, it indicates that the SR policy information associated with the BSID needs to be obtained, when the value of the flag field is a hexadecimal value 0x11, it indicates that the active SID information and the SR policy information associated with the BSID need to be obtained, when the value of the flag field is a hexadecimal value 0x100, it indicates that the service chain information needs to be obtained, when the value of the flag field is a hexadecimal value 0x101, it indicates that the service chain information and the active SID information need to be obtained, when the value of the flag field is a hexadecimal value 0x110, it indicates that the service chain information and the SR policy information associated with the BSID need to be obtained, and when the value of the flag field is a hexadecimal value 0x111, it indicates that the service chain information, the active SID information, and the SR policy information associated with the BSID need to be obtained.

It should be noted that, when the flag field is not set (for example, a default value of the flag field is the hexadecimal value 0x00), the flag field may indicate by default that the SRv6 tunnel information is not returned, or may indicate by default that all SRv6 tunnel information is returned. This is specifically determined based on different requirement scenarios. For example, when there is a large amount of SRv6 tunnel information, the flag field may indicate that no SRv6 tunnel information is returned, to prevent excessive information from being returned. When there is not so much SRv6 tunnel information, the flag field may indicate that all SRv6 tunnel information is returned. This is only an example. The user may define a meaning of a default value of the flag field based on different requirements of the user. There is no limitation imposed herein.

Further, a length field and an options field may be extended in the payload of the UDP packet. The length field indicates a length of the options field, for example, 2 bytes. The options field is an optional part, and may indicate that the flag field (that is, the second field described above) indicates a specific parameter (information) in the obtained information type. For example, the specific parameter is a piece of sub-information in the active SID information a SID type. The options field may be in a type length value (TLV) format. For example, both a length of a type field and a length of a length field are 2 bytes. It should be noted that, if a value of the options field is not defined currently, the length field is always set to 0.

Further, a reserved (Res) field may be extended in the payload of the UDP packet. The Res field is a Res field, is not defined currently, and is used for extension based on a future requirement. For example, a length of the Res field is 2 bytes. When the UDP detection packet is generated, the Res field should be set to 0. When receiving the UDP detection packet, a network device ignores the Res field.

201. The second network device receives the request packet from the first network device.

For description of the request packet, refer to the description in foregoing 101. For brevity, details are not described herein again.

202. The second network device obtains the SRv6 tunnel information of the second network device based on the request packet.

In a specific implementation, that the second network device obtains the SRv6 tunnel information of the second network device based on the request packet includes the following.

When the first field indicates to obtain the SRv6 tunnel information of the network device on the SRv6 tunnel, and the second field indicates to obtain the active SID information of the network device on the SRv6 tunnel, the second network device obtains active SID information of the second network device.

When the first field indicates to obtain the SRv6 tunnel information of the network device on the SRv6 tunnel, and the second field indicates to obtain the SR policy information that is of the network device on the SRv6 tunnel and that is associated with the BSID, the second network device obtains SR policy information that is of the second network device and that is associated with a BSID.

When the first field indicates to obtain the SRv6 tunnel information of the network device on the SRv6 tunnel, and the second field indicates to obtain the active SID information of the network device on the SRv6 tunnel and the SR policy information that is of the network device on the SRv6 tunnel and that is associated with the BSID, the second network device obtains the active SID information of the second network device and the SR policy information that is of the second network device and that is associated with the BSID.

When the first field indicates to obtain the SRv6 tunnel information of the network device on the SRv6 tunnel, and the second field indicates to obtain the service chain information of the network device on the SRv6 tunnel, the second network device obtains service chain information of the second network device.

When the first field indicates to obtain the SRv6 tunnel information of the network device on the SRv6 tunnel, and the second field indicates to obtain the service chain information of the network device on the SRv6 tunnel and the active SID information of the network device on the SRv6 tunnel, the second network device obtains the service chain information of the network device on the SRv6 tunnel and the active SID information of the network device on the SRv6 tunnel.

When the first field indicates to obtain the SRv6 tunnel information of the network device on the SRv6 tunnel, and the second field indicates to obtain the service chain information of the network device on the SRv6 tunnel and the SR policy information that is of the network device on the SRv6 tunnel and that is associated with the BSID, the second network device obtains the service chain information of the network device on the SRv6 tunnel and the SR policy information that is of the network device on the SRv6 tunnel and that is associated with the BSID.

When the first field indicates to obtain the SRv6 tunnel information of the network device on the SRv6 tunnel, and the second field indicates to obtain the service chain information of the network device on the SRv6 tunnel, the active SID information of the network device on the SRv6 tunnel, and the SR policy information that is of the network device on the SRv6 tunnel and that is associated with the BSID, the second network device obtains the service chain information of the network device on the SRv6 tunnel, the active SID information of the network device on the SRv6 tunnel, and the SR policy information that is of the network device on the SRv6 tunnel and that is associated with the BSID.

Based on a requirement indicated by the first field and a requirement indicated by the second field, the second network device obtains the related SRv6 tunnel information of the second network device on demand. This helps accurate and quick obtaining of information, and improves efficiency and flexibility of the obtaining of the information.

203. The second network device sends a response packet to the first network device, where the response packet includes the SRv6 tunnel information of the second network device.

In a specific implementation, the response packet is an ICMP packet, and the ICMP packet carries the SRv6 tunnel information of the second network device. The SRv6 tunnel information of the second network device includes at least one of the following information the active SID information of the second network device and the SR policy information that is of the second network device and that is associated with the BSID.

The ICMP packet is extended to carry the SRv6 tunnel information of the second network device. This provides a simple and convenient method, and helps implement a solution in a simple and convenient manner.

The ICMP packet may be, for example, an ICMP timeout error packet or an ICMP port unreachable error packet. The ICMP timeout error packet may be an IPv4-based ICMP over IPv4 (ICMPv4) error packet whose type is 11 and whose code is 0, or may be an IPv6-based ICMP over IPv6 (ICMPv6) error packet whose type is 3 and whose code is 0. The ICMP port unreachable error packet may be an IPv4-based ICMPv4 error packet whose type is 3 and whose code is 3, or may be an IPv6-based ICMPv6 error packet whose type is 1 and whose code is 4. For detailed descriptions of the ICMP timeout error packet and the ICMP port unreachable error packet, refer to the request for comments (RFC) 4443 released by the IETF. Contents of this document and parts related to this aspect seem to be copied as a whole, and are incorporated into this application by reference (incorporated by reference). For a description of a contradiction or conflict that the document has with this application, a description of this application shall prevail. In this specification, for brevity, details are not described herein.

Figure 3B:
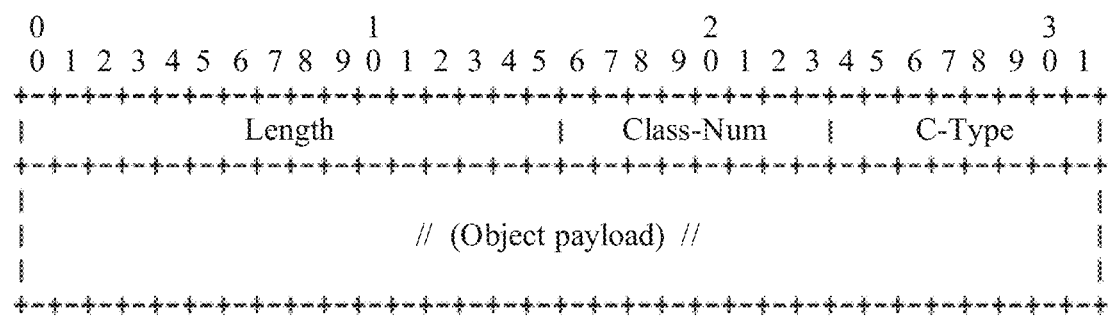
FIG. 3B is a schematic diagram of a format of an ICMP extension object filed according to an embodiment of this application.

Further, the ICMP packet includes an ICMP extension object field, and a format of the ICMP extension object field is shown in FIG. 3B. The ICMP extension object field includes a length field, a Class-Num field, a C-Type field, and an object payload field.

The length field is used to indicate a length of the ICMP extension object field.

A value of the Class-Num field is a newly defined value, and is used to indicate that the object payload field carries the SRv6 tunnel information of the network device on the SRv6 tunnel. For example, any value in a range [247, 255] may be used.

A value of the C-Type field is used to indicate that the object payload field carries a type of information in the SRv6 tunnel information of the network device on the SRv6 tunnel the active SID information, the SR policy information associated with the BSID, or the service chain information.

For example, when being 1, the value of the C-Type field indicates that the object payload field carries the active SID information in the SRv6 tunnel information of the network device on the SRv6 tunnel. For details of the active SID information, refer to the description in foregoing 101. Details are not described herein again.

When being 2, the value of the C-Type indicates that the object payload field carries the SR policy information that is of the network device on the SRv6 tunnel and that is associated with the BSID. For details of the SR policy information associated with the BSID, refer to the description in foregoing 101. Details are not described herein again.

When being 3, the value of the C-Type indicates that the object payload field carries the service chain information of the network device on the SRv6 tunnel. For details of the service chain information, refer to the description in foregoing 101. Details are not described herein again.

It should be noted that the value of the C-Type is one example, and does not have any limitation. A specific value is subject to a standardized value.

Based on the value of the C-Type field, a value of the object payload field is one of the active SID information of the second network device, the SR policy information that is of the second network device and that is associated with the BSID, and the service chain information of the second network device.

If needing to carry a plurality of types of SRv6 tunnel information, the response packet may carry a plurality of ICMP extension objects. For example, if the active SID information and the service chain information need to be carried and returned to the first network device, two ICMP extension objects may be carried. A C-Type value of one ICMP extension object is 1, and the ICMP extension object is used to carry the active SID information. A C-Type value of the other ICMP extension object is 3, and the ICMP extension object is used to carry the service chain information.

For detailed descriptions of the format of the ICMP extension object field, refer to the RFC 4884 released by the IETF. Contents of this document and parts related to this aspect seem to be copied as a whole, and are incorporated into this application by reference (incorporated by reference). For a description of a contradiction or conflict that the document has with this application, a description of this application shall prevail. In this specification, for brevity, details are not described herein.

The value of the extension object field in the ICMP packet is extended to support carrying SRv6 tunnel information of classification granularities. This provides a simple and convenient method for implementing a solution in a simple and convenient manner. SRv6 tunnel information that is of granularities and that is required by the user is flexibly carried on demand.

102. The first network device receives the response packet from the second network device, where the response packet includes the SRv6 tunnel information of the second network device.

103. The first network device obtains the SRv6 tunnel information of the second network device based on the response packet.

For detailed descriptions of the response packet, refer to foregoing 201. For detailed descriptions of the SRv6 tunnel information, refer to the foregoing 101. Details are not described herein again.

In conclusion, the response packet and the request packet that detects reachability of the SRv6 tunnel (or path) are extended to enable a traceroute to obtain the SRv6 tunnel information. This helps maintain and manage the SRv6 tunnel.

The following further describes the embodiments of the present disclosure in detail based on examples of application scenarios in FIG. 1A and FIG. 1B. A first network device in the following may be PE1 or CE1 in FIG. 1A and FIG. 1B, and a second network device may be P1, P2, P3, or PE2 in FIG. 1A and FIG. 1B. A path of an SRv6 tunnel from PE1 to PE2 is PE1-P1-P2-P3-PE2. PE1, PE2, P1, and P2 support and enable an SRv6 function. However, P3 does not support or enable the SRv6 function.

For example, as shown in FIG. 1A, as an ingress node, PE1 initiates obtaining of SRv6 tunnel information of all nodes (which are sequentially P1, P2, P3, and PE2) on the tunnel from PE1 to PE2. PE1 separately sends an extended IP traceroute detection packet to P1, P2, P3, and PE2 to obtain SRv6 tunnel information of each node, for example, active SID information of each node and SR policy information associated with a BSID.

PE1 is triggered, through configuration, to generate a UDP detection packet 1 with a time to live (TTL) of one hop. The packet is sent to the P1 node. For example, the following IP traceroute command line is run:

tracert PE2-ip-address -srv6 {active-sid|bsid} -m<1>.

-m<max-hop-limit> indicates a limit on a maximum hop count, and is set to 1 herein, indicating that the TTL of the UDP detection packet 1 is 1.

The UDP detection packet 1 is encapsulated in an IP packet header. A TTL value of the IP packet header is 1. Specifically, a TTL field of an IPv4 packet header carries the TTL value, and a hop limit field of an IPv6 carries the TTL value. A value of a marker field in the UDP detection packet 1 is set to indicate to obtain the SRv6 tunnel information. A value of a flag field is set to indicate to obtain the active SID information and the SR policy information associated with the BSID. A destination IP address of the IP header that encapsulates the UDP detection packet 1 is an IP address of PE2.

After receiving the UDP detection packet 1, P1 obtains the destination IP address, namely, the IP address of PE2. After searching for a forwarding entry, P1 subtracts the TTL value (=1) by 1 to obtain 0, and sends the packet to a control plane for processing, to trigger processing of an ICMP TTL timeout error. Then, P1 generates an ICMP timeout error packet 1. P1 parses an indication of the marker field and an indication of the flag field to obtain the active SID information of P1 and the SR policy information associated with the BSID. Role information that is locally stored in P1 and that is obtained by P1 indicates P1 as an endpoint node. To be specific, P1 supports and enables the SRv6 function, but does not support a BSID function. Therefore, there is no SR policy information associated with the BSID on P1. P1 obtains only the active SID information of P1. P1 encapsulates the active SID information of P1 into the ICMP timeout error packet 1, and sends the packet to PE1.

PE1 obtains the active SID information of P1 from the ICMP timeout error packet 1.

Similarly, PE1 is triggered, through configuration, to generate a UDP detection packet 2 with a TTL being 2. The packet is sent to the P2 node. The UDP detection packet 2 arrives at P1 first. P1 obtains the destination IP address, namely, the IP address of PE2, and compares the destination IP address with an IP address of P1. A result is that the IP address of PE2 is different from the IP address of P1. Then, the TTL value (=2) is subtracted by 1 to obtain 1. In this case, a TTL timeout is not triggered. Therefore, the UDP detection packet 2 (the TTL value is 1) continues to be forwarded to P2. Processing is the same as that when P1 receives the UDP detection packet 1. On P2, the TTL value (=1) is subtracted by 1 to obtain 0, to trigger TTL timeout processing. In this case, a role of P2 is the same as that of P1, is the endpoint node, and has no SR policy information associated with the BSID. Therefore, P2 can only encapsulate the active SID information of P2 into an ICMP timeout error packet 2, and send the packet to PE1.

PE1 obtains the active SID information of P2 from the ICMP timeout error packet 2.

Then, similarly, PE1 is triggered, through configuration, to generate a UDP detection packet 3 with a TTL being 3. The packet is sent to the P3 node. Because the P3 node is a transit node or a non-SRv6 node, there is no SRv6 tunnel information on P3. A sent ICMP timeout error packet 3 does not carry the SRv6 tunnel information.

Finally, similarly, PE1 is triggered, through configuration, to generate a UDP detection packet 4 with a TTL being 4. The packet is sent to the PE2 node. After receiving the UDP detection packet 4, PE2 obtains the destination IP address, namely, the IP address of PE2, and searches for the forwarding entry. If finding that the DA is its (PE2) own IP address, PE2 sends the packet to the control plane for processing. Then, a destination port number of the UDP detection packet 4 is parsed as an unused UDP port number (for example, a default value is 33434), and an ICMP port unreachable error packet 1 is generated. PE2 further parses the marker field and the flag field to obtain the active SID information of P1 and the SR policy information associated with the BSID. Role information that is locally stored in PE2 and that is obtained by PE2 indicates PE2 as the endpoint node. Therefore, there is no SR policy information associated with the BSID on PE2. PE2 obtains only the active SID information of PE2. PE2 encapsulates the active SID information of PE2 into the ICMP port unreachable error packet 1, and sends the packet to PE1.

PE1 obtains the active SID information of PE2 from the ICMP port unreachable error packet 1. PE1 has obtained the active SID information of all nodes on the SRv6 tunnel.

The scenario shown in FIG. 1B is similar to the scenario shown in FIG. 1A. The only difference is that the P2 node in FIG. 1B is a BSID node. Therefore, in FIG. 1B, a procedure in which PE1 separately sends an extended IP traceroute detection packet to P1, P2, P3, and PE2 to obtain active SID information of each node and SR policy information associated with a BSID is the same as the procedure in FIG. 1A. The only difference is that, after P2 receives a UDP detection packet 2, P2 parses an indication of a marker field and an indication of a flag field to obtain the active SID information of P2 and the SR policy information associated with the BSID. Role information that is locally stored in P2 and that is obtained by P2 indicates P2 as the BSID node. P2 parses out an active SID 1 from an SRH in an IPv6 packet of the UDP detection packet 2, and learns, by querying a my local SID table, that the active SID 1 is associated with a piece of SR policy information. In this case, the active SID 1 is referred to as a BSID 1. Therefore, the SR policy information associated with the BSID 1 is obtained. P2 encapsulates the active SID information of the P2 and the SR policy information that is of P2 and that is associated with the BSID 1 into an ICMP timeout error packet 1, and sends the packet to PE1. Therefore, PE1 further obtains the SR policy information that is of the P2 node and that is associated with the BSID.

It should be noted that PE1 is used as an initiating device of IP traceroute detection. In addition, CE1 may also be used as the initiating device. Similarly, SRv6 tunnel information of PE1, P1, P2, and PE2 can be obtained.

It should be further noted that the IP traceroute detection initiated by CE1 or PE1 may be IPv6 traceroute detection or IPv4 traceroute detection. If the IPv4 traceroute detection is used, PE1 and PE2 support an IPv4 and IPv6 dual-stack function and IPv4-to-IPv6 conversion.

Figure 4:
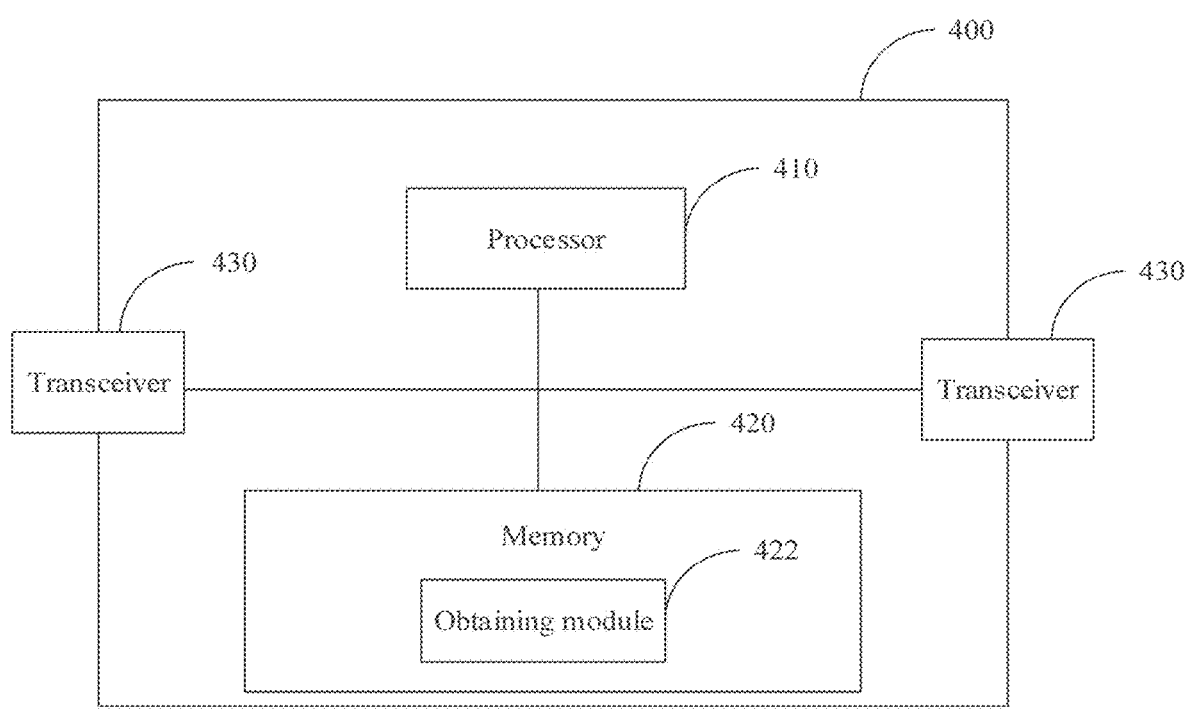
FIG. 4 is a schematic diagram of a first network device 400 according to an embodiment of this application.

FIG. 4 is a schematic diagram of a first network device according to an embodiment of this application.

As shown in FIG. 4, the first network device 400 includes a processor 410, a memory 420 coupled to the processor 410, and a transceiver 430. The first network device 400 may be PE1 or CE1 in FIG. 1A and FIG. 1B, and is the first network device in FIG. 2. The processor 410 may be a central processing unit (CPU), a network processor (NP), or a combination of a CPU and an NP. Alternatively, the processor may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The processor 410 may be one processor, or may include a plurality of processors. The transceiver 430 is configured to send a request packet to a second network device. The request packet is used to request to detect reachability of an SRv6 tunnel and obtain SRv6 tunnel information of the second network device. The second network device is a network device on the SRv6 tunnel. The transceiver 430 is further configured to receive a response packet from the second network device. The response packet includes the SRv6 tunnel information of the second network device. The memory 420 may include a volatile memory such as a random-access memory (RAM), or the memory may include a non-volatile memory such as a read-only memory (ROM), a flash memory, a hard disk drive (HDD), or a solid-state drive (SSD). Alternatively, the memory may include a combination of the foregoing types of memories. The memory 420 stores a computer-readable instruction. The computer-readable instruction includes at least one software module, for example, an obtaining module 422. After executing each software module, the processor 410 may perform a corresponding operation according to an indication of each software module. In this embodiment, an operation performed by a software module is actually an operation performed by the processor 410 according to an indication of the software module. The obtaining module 422 may be configured to obtain the SRv6 tunnel information of the second network device based on the response packet. In addition, after executing the computer-readable instruction in the memory 420, the processor 410 may perform, according to an instruction of the computer-readable instruction, all operations that can be performed by the first network device, for example, operations that the first network device performs in embodiments corresponding to FIG. 1A, FIG. 1B, FIG. 2, FIG. 3A and FIG. 3B.

Figure 5:
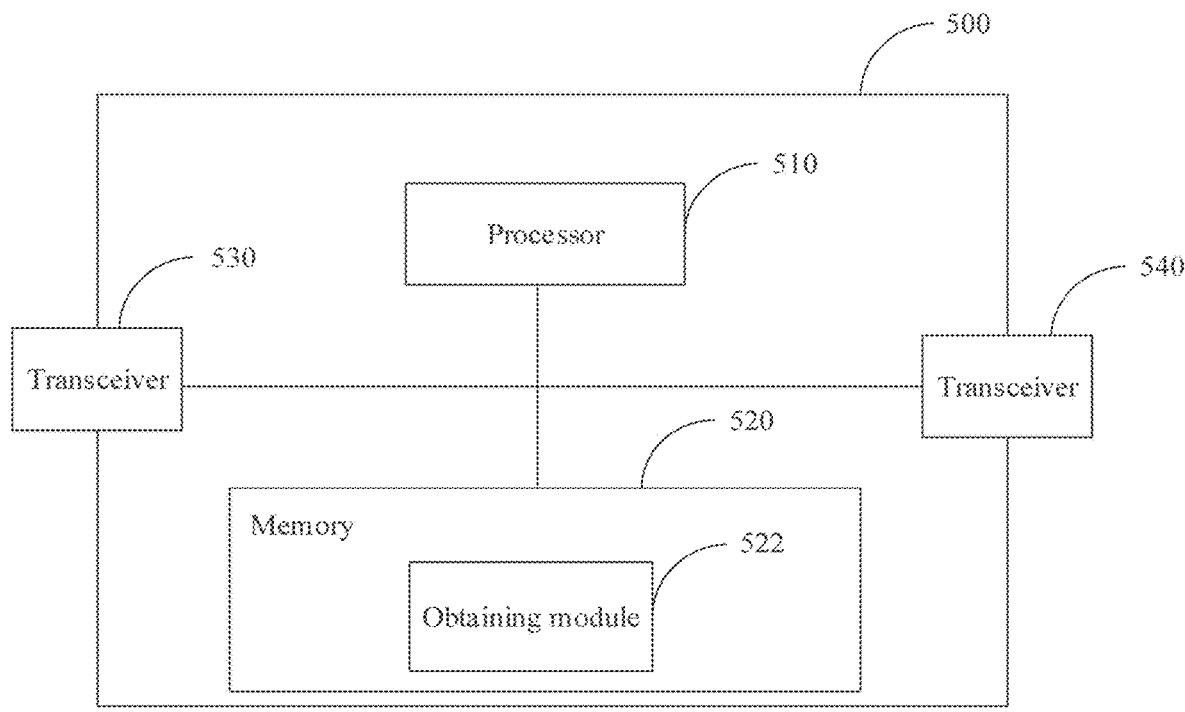
FIG. 5 is a schematic diagram of a second network device 500 according to an embodiment of this application.

FIG. 5 is a schematic diagram of a second network device 500 according to an embodiment of this application.

As shown in FIG. 5, the second network device 500 includes a processor 510, a memory 520 coupled to the processor 510, and a transceiver 530. The second network device 500 may be the P1, P2, or P3 node in FIG. 1A and FIG. 1B, and is the second network device in FIG. 2. The processor 510 may be a CPU, a NP, or a combination of a CPU and an NP. Alternatively, the processor may be an ASIC, a PLD, or a combination thereof. The PLD may be a CPLD, a FPGA, GAL, or any combination thereof. The processor 510 may be one processor, or may include a plurality of processors. The transceiver 530 is configured to receive a request packet from a first network device. The request packet is used to request to detect reachability of an SRv6 tunnel and obtain SRv6 tunnel information of the second network device. The second network device is a network device on the SRv6 tunnel. The memory 520 may include a volatile memory such as a RAM, or the memory may include a non-volatile memory, such as a ROM, a flash memory, a HDD, or an SSD. Alternatively, the memory may include a combination of the foregoing types of memories. The memory 520 stores a computer-readable instruction. The computer-readable instruction includes at least one software module, for example, an obtaining module 522. After executing each software module, the processor 510 may perform a corresponding operation according to an indication of each software module. In this embodiment, an operation performed by a software module is actually an operation performed by the processor 510 according to an indication of the software module. The obtaining module 522 is configured to obtain the SRv6 tunnel information of the second network device based on the request packet. The transceiver 530 is further configured to send a response packet to the first network device. The response packet includes the SRv6 tunnel information of the second network device. In addition, after executing the computer-readable instruction in the memory 520, the processor 510 may perform, according to an instruction of the computer-readable instruction, all operations that can be performed by a control management device, for example, operations that the control management device performs in embodiments corresponding to FIG. 1A, FIG. 1B, FIG. 2, FIG. 3A and FIG. 3B.

Figure 6:
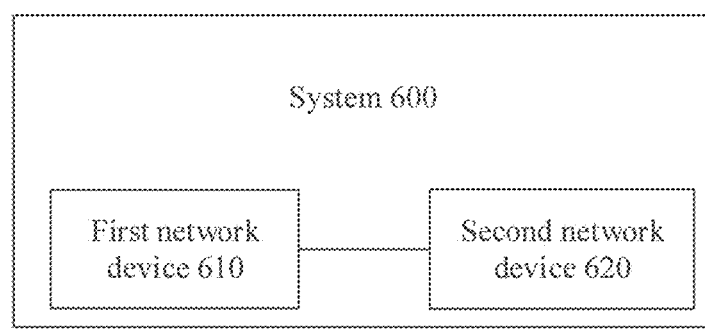
FIG. 6 is a schematic diagram of a system 600 according to an embodiment of this application.

FIG. 6 is a schematic diagram of a system for obtaining SRv6 tunnel information according to an embodiment of the present disclosure.

As shown in FIG. 6, a system 600 includes a first network device 610 and a second network device 620. The first network device 610 is the network device in FIG. 4. The second network device 620 is the second network device in FIG. 5. For detailed descriptions of the devices in the system, refer to the foregoing related chapters in FIG. 4, FIG. 5, and the like. Details are not described herein again.

It should be understood that a person skilled in the art can obtain, on a basis of reading this application, combinations of optional features, steps, or methods described in embodiments in this application without creative efforts, and all of the combinations belong to embodiments disclosed in this application. For simple description or writing, different combinations are not described.

The term "and/or" in this specification describes only an association relationship for describing associated objects and represents that three relationships may exist. For example, A and/or B may represent the following three cases. Only A exists, both A and B exist, and only B exists. In addition, the character "/" in this specification generally indicates an "or" relationship between the associated objects.

It should be understood that sequence numbers of the foregoing processes do not mean execution sequences in the embodiments of the present disclosure. The execution sequences of the processes should be determined according to functions and internal logic of the processes, and should not be construed as any limitation on the implementation processes of the embodiments of the present disclosure.

The foregoing descriptions are certain implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure.

What is claimed is:

1. A method for obtaining segment routing over Internet Protocol version 6 data plane (SRv6) tunnel information, implemented by a first network device, wherein the method comprises:
   sending a request packet along an SRv6 tunnel to a second network device, wherein the request packet indicates a first request to the second network device to detect reachability of the SRv6 tunnel, wherein the request packet is a User Datagram Protocol (UDP) packet comprising a first field and a second field, the first field indicating a second request to obtain SRv6 tunnel information of the second network device, wherein the SRv6 tunnel information comprises at least one of active segment identifier (SID) information of the second network device, segment routing (SR) policy information of the second network device and that is associated with a binding segment identifier (BSID), or service chain information of the second network device, and the second field indicating which of the at least one of the active SID information, the SR policy information, or the service chain information to obtain, and wherein the second network device is on the SRv6 tunnel;
   receiving a response packet from the second network device, wherein the response packet comprises the SRv6 tunnel information; and
   obtaining the SRv6 tunnel information from the response packet.

2. The method of claim 1, wherein before sending the request packet to the second network device, the method further comprises:
   obtaining a keyword from a command line based on a configuration from a user; and
   generating the request packet based on the keyword, wherein the keyword indicates to obtain the SRv6 tunnel information.

3. The method of claim 1, wherein the UDP packet further comprises an optional field that carries a parameter for the at least one of the active SID information, the SR policy information, or the service chain information that the second field indicates to obtain.

4. The method of claim 1, wherein the response packet is an Internet Control Message Protocol (ICMP) packet carrying the SRv6 tunnel information.

5. The method of claim 1, wherein the UDP packet is encapsulated in an IP packet.

6. The method of claim 4, wherein the ICMP packet comprises an ICMP extension object field, wherein the ICMP extension object field comprises a length field, a classification number (Class-Num) field, a classification type (C-Type) field, and an object payload field, wherein the length field indicates a length of the ICMP extension object field, wherein a first value of the Class-Num field indicates that the object payload field carries the SRv6 tunnel information on the SRv6 tunnel, wherein a second value of the C-Type field indicates that the object payload field carries the active SID information, the SR policy information, or the service chain information, and wherein a third value of the object payload field is at least one of the active SID information, the SR policy information, or the service chain information.

7. A first network device, comprising:
   a processor; and
   a memory coupled to the processor and configured to store instructions that, when executed by the processor, cause the first network device to be configured to:
      send a request packet along an Internet Protocol version 6 data plane (SRv6) tunnel to a second network device, wherein the request packet indicates a request to the second network device to detect reachability of the SRv6 tunnel, wherein the request packet is a User Datagram Protocol (UDP) packet comprising a first field and a second field, the first field indicating a second request to obtain SRv6 tunnel information of the second network device, wherein the SRv6 tunnel information comprises at least one of active segment identifier (SID) information of the second network device, segment routing (SR) policy information of the second network device and that is associated with a binding segment identifier (BSID), or service chain information of the second network device, and the second field indicating which of the at least one of the active SID information, the SR policy information, or the service chain information to obtain, and wherein the second network device is on the SRv6 tunnel;
      receive a response packet from the second network device, wherein the response packet comprises the SRv6 tunnel information; and
      obtain the SRv6 tunnel information from the response packet.

8. The first network device of claim 7, wherein before the instructions cause the first network device to send the request packet to the second network device, the instructions further cause the first network device to be configured to:
   obtain a keyword from a command line based on a configuration from a user and generate the request packet based on the keyword, wherein the keyword indicates to obtain the SRv6 tunnel information.

9. The first network device of claim 7, wherein the UDP packet further comprises an optional field that carries a parameter function for the at least one of the active SID information, the SR policy information, or the service chain information that the second field indicates to obtain.

10. The first network device of claim 9, wherein the UDP packet further comprises a length field indicating a length of the optional field.

11. The first network device of claim 10, wherein the UDP packet further comprises a reserved second field that is reserved for a new function.

12. The first network device of claim 7, wherein the response packet is an Internet Control Message Protocol (ICMP) packet carrying the SRv6 tunnel information.

13. The first network device of claim 7, wherein the UDP packet is encapsulated in an IP packet.

14. The first network device of claim 12, wherein the ICMP packet comprises an ICMP extension object field, wherein the ICMP extension object field comprises a length field, a classification number (Class-Num) field, a classification type (C-Type) field, and an object payload field, wherein the length field indicates a length of the ICMP extension object field, wherein a first value of the Class-Num field indicates that the object payload field carries the SRv6 tunnel information, wherein a second value of the C-Type field indicates that the object payload field carries the active SID information, the SR policy information, or the service chain information, and wherein a third value of the object payload field is at least one of the active SID information, the SR policy information, or the service chain information.

15. A second network device, comprising:
- a processor; and
- a memory coupled to the processor and configured to store instructions that, when executed by the processor, cause the second network device to be configured to:
  - receive a request packet along an Internet Protocol version 6 data plane (SRv6) tunnel from a first network device, wherein the request packet indicates a first request to the second network device to detect reachability of the SRv6 tunnel, wherein the request packet is a User Datagram Protocol (UDP) packet comprising a first field and a second field, the first field indicating a second request to obtain SRv6 tunnel information of the second network device, wherein the SRv6 tunnel information comprises at least one of active segment identifier (SID) information of the second network device, segment routing (SR) policy information of the second network device and that is associated with a binding segment identifier (BSID), or service chain information of the second network device, and the second field indicating which of the at least one of the active SID information, the SR policy information, or the service chain information to obtain, and wherein the second network device is on the SRv6 tunnel;
  - obtain the SRv6 tunnel information in response to the request packet; and
  - send a response packet to the first network device, wherein the response packet comprises the SRv6 tunnel information.

16. The second network device of claim 15, wherein the instructions, when executed by the processor, further cause the second network device to be configured to:
- obtain the active SID information of the second network device when the first field of a indicates to obtain the SRv6 tunnel information, and when the second field indicates to obtain the active SID information;
- obtain the SR policy information of the second network device that is associated with a binding segment identifier (BSID) when the first field indicates to obtain the SRv6 tunnel information, and when the second field indicates to obtain the SR policy information;
- obtain the active SID information and the SR policy information when the first field indicates to obtain the SRv6 tunnel information, and when the second field indicates to obtain the active SID information and the SR policy information;
- obtain the service chain information of the second network device when the first field indicates to obtain the SRv6 tunnel information, and when the second field indicates to obtain the service chain information;
- obtain the service chain information and the active SID information when the first field indicates to obtain the SRv6 tunnel information, and when the second field indicates to obtain the service chain information and the active SID information;
- obtain the service chain information and the SR policy information when the first field indicates to obtain the SRv6 tunnel information, and when the second field indicates to obtain the service chain information and the SR policy information; and
- obtain the service chain information, the active SID information, and the SR policy information when the first field indicates to obtain the SRv6 tunnel information, and when the second field indicates to obtain the service chain information, the active SID information, and the SR policy information.

17. The method of claim 1, wherein before sending the request packet to the second network device, the method further comprises:
- receiving a message from a control management device; and
- generating the request packet based on the message, wherein the message indicates to obtain the SRv6 tunnel information.

18. The method of claim 3, wherein the UDP packet further comprises a length field indicating a length of the optional field.

19. The method of claim 18, wherein the UDP packet further comprises a reserved field that is reserved for a new function.

20. The first network device of claim 7, wherein before the instructions cause the first network device to send the request packet to the second network device, the instructions further cause the first network device to be configured to receive a message from a control management device and generate the request packet based on the message, wherein the message indicates to obtain the SRv6 tunnel information.

* * * * *

UNITED STATES PATENT AND TRADEMARK OFFICE
CERTIFICATE OF CORRECTION

PATENT NO. : 11,558,341 B2
APPLICATION NO. : 17/216395
DATED : January 17, 2023
INVENTOR(S) : Jianjian Shi, Ting Hua and Yongkang Zhang It is certified that error appears in the above-identified patent and that said Letters Patent is hereby corrected as shown below:

In the Claims

Claim 11, Column 22, Line 63: "reserved second field that" should read "reserved field that"

Claim 13, Column 23, Line 2: "IP packet." should read "IP packet of."

Signed and Sealed this
Twenty-first Day of March, 2023

Katherine Kelly Vidal
*Director of the United States Patent and Trademark Office*